US009302858B2

(12) United States Patent
Junghans

(10) Patent No.: US 9,302,858 B2
(45) Date of Patent: Apr. 5, 2016

(54) METHOD FOR HANDLING PACKAGES IN A BEVERAGE BOTTLING PLANT, A METHOD FOR UNSTACKING PACKAGES IN A CONTAINER FILLING PLANT, A METHOD FOR STACKING PACKAGES IN A CONTAINER FILLING PLANT, AND ARRANGEMENTS FOR ACCOMPLISHING THE METHODS

(75) Inventor: Joachim Junghans, Frankfurt (DE)

(73) Assignee: KHS GmbH, Dortmund (DE)

( * ) Notice: Subject to any disclaimer, the term of this patent is extended or adjusted under 35 U.S.C. 154(b) by 1120 days.

(21) Appl. No.: 12/702,043

(22) Filed: Feb. 8, 2010

(65) Prior Publication Data

US 2010/0226746 A1   Sep. 9, 2010

Related U.S. Application Data

(63) Continuation-in-part of application No. PCT/EP2008/005758, filed on Jul. 15, 2008.

(30) Foreign Application Priority Data

Aug. 6, 2007   (DE) .......................... 10 2007 036 900

(51) Int. Cl.
*B65B 21/02*   (2006.01)
*B65G 57/03*   (2006.01)
(Continued)

(52) U.S. Cl.
CPC ............... *B65G 57/03* (2013.01); *B65G 57/20* (2013.01); *B65G 59/023* (2013.01); *B65G 61/00* (2013.01)

(58) Field of Classification Search
USPC ............ 414/411, 416.01, 416.07, 623, 796.9, 414/558, 664, 668
See application file for complete search history.

(56) References Cited

U.S. PATENT DOCUMENTS 4,815,915 A * 3/1989 Crupi, Jr. ...................... 414/563
5,338,150 A   8/1994 Focke et al.
(Continued)

FOREIGN PATENT DOCUMENTS

DE   29 01 105 A1   7/1980
DE   88 04 175 U1   5/1988
(Continued)

OTHER PUBLICATIONS

International Search Report PCT/EP/2008/005758 and English translation thereof.
(Continued)

*Primary Examiner* — Saul Rodriguez
*Assistant Examiner* — Willie Berry, Jr.
(74) *Attorney, Agent, or Firm* — Nils H. Ljungman & Associates

(57) ABSTRACT

A method for handling packages in a beverage bottling plant, a method for unstacking packages in a container filling plant, a method for stacking packages in a container filling plant, and arrangements for accomplishing the methods. The abstract of the disclosure is submitted herewith as required by 37 C.F.R. §1.72(b). As stated in 37 C.F.R. §1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

20 Claims, 7 Drawing Sheets

(51) Int. Cl.
*B65G 57/20* (2006.01)
*B65G 59/02* (2006.01)
*B65G 61/00* (2006.01)

(56) References Cited

U.S. PATENT DOCUMENTS 5,462,400 A 10/1995 Bonnet
5,829,939 A * 11/1998 Iwai et al. ............... 414/411

FOREIGN PATENT DOCUMENTS

| DE | 91 11788 U1 | 11/1991 |
| DE | 40 33 587 A1 | 4/1992 |
| DE | 41 24 703 A1 | 1/1993 |
| DE | 4128 809 A1 | 3/1993 |
| DE | 84 25 924 U1 | 4/1993 |
| DE | 29913060 (U1) | 12/2000 |
| DE | 19946550 (A1) | 4/2001 |
| DE | 10 2005 016 431 A1 | 10/2006 |
| EP | 0 366 943 A | 5/1990 |
| EP | 0 482 406 A | 4/1992 |
| NL | 8 900 654 A | 10/1990 |

OTHER PUBLICATIONS

German Office Action 10 2007 036 900.1-22.
European Office Action dated Dec. 2, 2015.

* cited by examiner

US 9,302,858 B2

METHOD FOR HANDLING PACKAGES IN A BEVERAGE BOTTLING PLANT, A METHOD FOR UNSTACKING PACKAGES IN A CONTAINER FILLING PLANT, A METHOD FOR STACKING PACKAGES IN A CONTAINER FILLING PLANT, AND ARRANGEMENTS FOR ACCOMPLISHING THE METHODS

CONTINUING APPLICATION DATA

This application is a Continuation-In-Part application of International Patent Application No. PCT/EP2008/005758, filed on Jul. 15, 2008, which claims priority from Federal Republic of Germany Patent Application No. 10 2007 036 900.1, filed on Aug. 6, 2007. International Patent Application No. PCT/EP2008/005758 was pending as of the filing date of this application. The United States was an elected state in International Patent Application No. PCT/EP2008/005758.

BACKGROUND

1. Technical Field

The present application relates to a method for handling packages in a beverage bottling plant, a method for unstacking packages in a container filling plant, a method for stacking packages in a container filling plant, and arrangements for accomplishing the methods.

2. Background Information

Background information is for informational purposes only and does not necessarily admit that subsequently mentioned information and publications are prior art.

The present application relates to a method for armed stacking or stacking packages and a device for accomplishing this method.

The present application relates to a method for unstacking packages, positioned in each case on a transport carrier in the form of a package stack, by using a depalletizing means with a support or transfer frame that is displaceable in a controlled manner in the horizontal and/or vertical direction. At a first position of the depalletizing means, the packages form a package stack arrangement, which includes at least two packages in a plurality of layers that are positioned one above the other in the vertical direction, and from which the packages are removed layerwise or in the form of a part or total stack with the assistance of the support or transfer frame and are deposited at a further position of the depalletizing means for removal by means of at least one conveyor. The present application also relates to a device for unstacking or stacking packages. The device comprises a support or transfer frame that is displaceable in a controlled manner in the horizontal and/or vertical direction for picking-up layers or total or part stacks, which each have at least two packages per layer, at a first position and for depositing the layers or total or part stacks at another position that is separated spatially from the first position. The support or transfer frame has at least one inside and at least two outside support arms, of which support arms the inside support arm is introducible between the at least two packages of the respective layer or of the lowest layer of the respective total or part stack in such a manner that it forms a lateral support and at the same time also a bearing surface for the packages on the two sides. The outside support arms are positioned at the one layer or at the lowest layer of the total or part stack in such a manner that they each form a lateral support and at the same time also a bearing surface for the packages at their outsides remote from the at least one inside support arm.

"Packages" in terms of the present application are such arrangements that are produced in each case from a carrier or tray, for example made of cardboard or paperboard (corrugated cardboard also), and from a plurality of containers disposed on the carrier. The packages are also, for example, empty packages with empty containers or bottles that are being returned, for example, to a beverage manufacturer as empties. However, the packages can also have filled containers, e.g. bottles.

Various embodiments of devices realized as depalletizing means for unstacking crates of bottles that are positioned on transport carriers are known. The basic method of operation of such devices is that by using a transfer device, which is realized for a controlled movement in the vertical and horizontal direction, a topmost layer, for example, of the stack of crates standing by at a first position (standby position) on a transport carrier, for example on a transport pallet, is engaged by lateral clamping at clamping or gripping arms, is raised from the stack of crates and is deposited onto a second position that is spatially separated from the first position or respectively onto a transport table or conveyor at that location, by means of which the crates are supplied to a further use.

Such devices are also suitable, at best with minor structural modifications, for stacking crates onto transport carriers, for example onto transport pallets. These devices are not suitable, however, for unstacking or stacking packages of the type defined above.

OBJECT OR OBJECTS

An object of the present application is to provide a method and a device, with which for example the unstacking, but in principle also the stacking of packages is possible.

SUMMARY

This object is achieved with a method for unstacking packages, positioned in each case on a transport carrier in the form of a package stack, by using a depalletizing means with a support or transfer frame that is displaceable in a controlled manner in the horizontal and/or vertical direction. At a first position of the depalletizing means, the packages form a package stack arrangement, which includes at least two packages in a plurality of layers that are positioned one above the other in the vertical direction. The packages are removed layerwise or in the form of a part or total stack with the assistance of the support or transfer frame and are deposited at a further position of the depalletizing means for removal by means of at least one conveyor. At least two package stacks each positioned on one transport carrier are combined to form the package stack arrangement. The picking-up of the packages at the first position is effected by means of at least one inside and at least two outside support arms of the carrier or transfer frame. The inside support arm is introduced between the at least two packages of the lowest layer to be removed in such a manner that it forms a lateral support and at the same time also a bearing surface for the packages positioned on the two sides. The outside support arms are positioned at the lowest layer to be removed in such a manner that they each form a lateral support and at the same time also a bearing surface for the packages on their outsides remote from the at least one inside support arm.

This object may also be achieved with a method for stacking packages on transport carriers by using a palletizing means with a support or transfer frame that is displaceable in a controlled manner in the horizontal and/or vertical direction. The packages are brought together to form layers or part stacks, each of which having at least two packages per layer, and are then picked up layerwise or in the form of a part stack with the assistance of the support or transfer frame and are deposited on transport carriers or part stacks already formed there to form package stacks. The picking-up of the packages combined to form layers or part stacks is effected by means of at least one inside and at least two outside support arms of the support or transfer frame. The inside support arm is introduced between the at least two packages of the respective layer or of the lowest layer of the part stack in such a manner that it forms a lateral support and at the same time also a bearing surface for the packages positioned on the two sides. The outside support arms are positioned at the layer or the lowest layer of the part stack in such a manner that they each form a lateral support and at the same time also a bearing surface for the packages on their outsides remote from the at least one inside support arm.

This object may also be achieved by a device for unstacking or stacking packages, which device comprises a support or transfer frame that is displaceable in a controlled manner in the horizontal and/or vertical direction for picking-up layers or total or part stacks, which each have at least two packages per layer, at a first position and for depositing the layers or total or part stacks at another position that is separated spatially from the first position. The support or transfer frame has at least one inside and at least two outside support arms. The inside support arm is introducible between the at least two packages of the respective layer or of the lowest layer of the respective total or part stack in such a manner that it forms a lateral support and at the same time also a bearing surface for the packages on the two sides. The outside support arms are positioned at the one layer or at the lowest layer of the total or part stack in such a manner that they each form a lateral support and at the same time also a bearing surface for the packages at their outsides remote from the at least one inside support arm.

Further developments and application possibilities of the present application are also produced from the following description of possible embodiments and from the Figures. In this case, the described and/or graphically represented features, individually on their own or in arbitrary combination, are in principle made an object of the present application, irrespective of their summary according to the present application. The content of the present application is also made a component of the description.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present application is described below by way of the Figures of an possible embodiment, in which, in detail.

DESCRIPTION OF EMBODIMENT OR EMBODIMENTS

Figure 1:
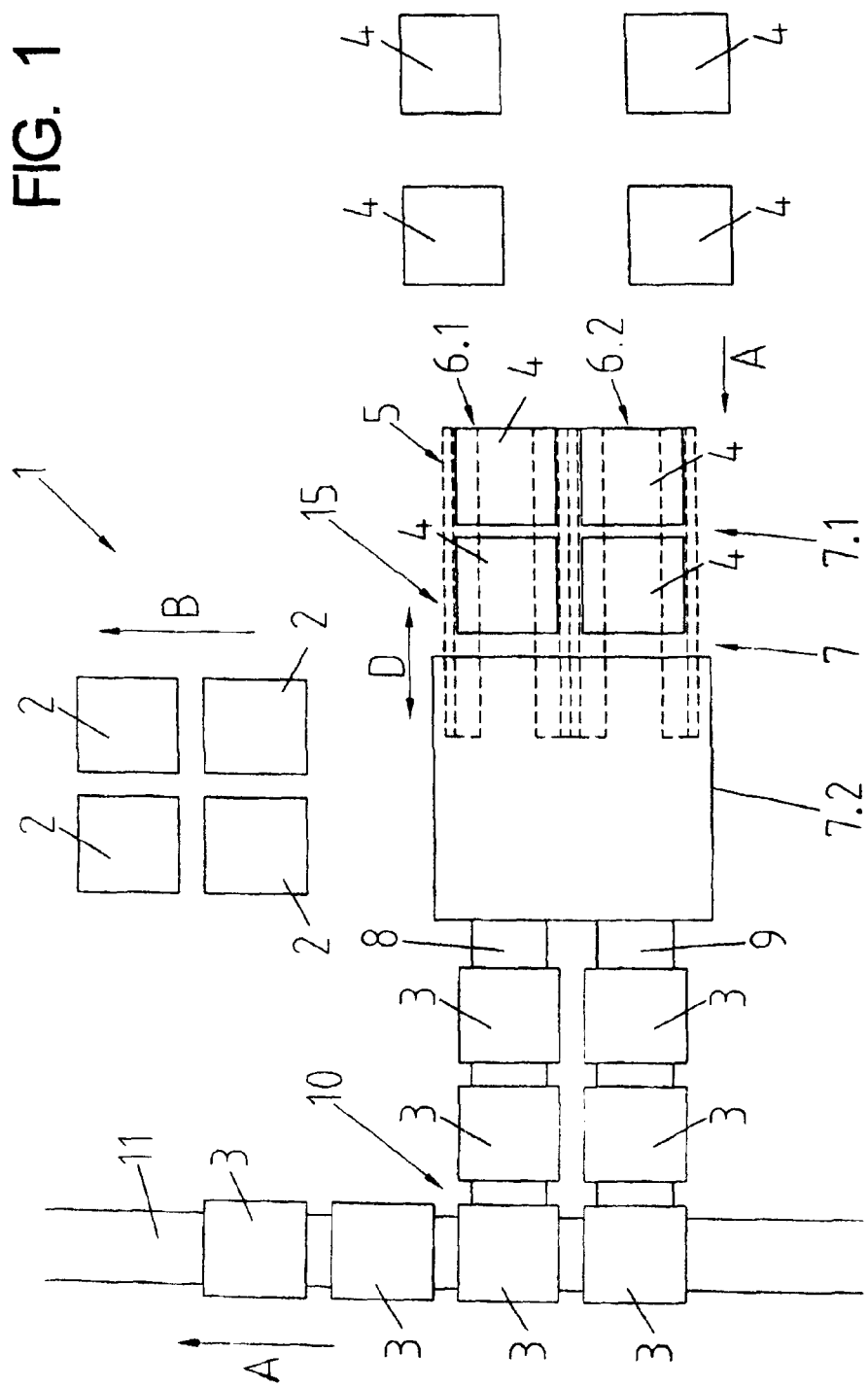
FIG. 1 shows a schematic representation and a block or function diagram of a system for unstacking or unloading packages stacked on transport carriers in the form of transport trolleys or dollies.

Package stacks 4, formed by packages 3 on transport carriers 2, are initially supplied in an individual manner to the system, identified in general in the Figures by the reference 1, in the direction of the arrow A. The packages 3 form a package stack 4 on each transport carrier 2, which is in the form of a trolley or dolly provided with four running wheels 2.1, said package stack having, for example, a total of five packages 3 stacked one above the other, said packages each comprising one package carrier or tray 3.1 produced, for example, from cardboard or paperboard (corrugated cardboard also) and a plurality of containers or bottles 3.2 standing on said tray. For reasons of clarity, the tray 3.1 and the bottles 3.2 are shown for one of the packages 3 in FIG. 2, whereas the remaining packages 3 are reproduced in a simplified manner. To achieve the necessary and/or desired stability, the bottles 3.2 of each package 3 (with the exception of the topmost package 3) extend with their bottle mouths into an opening in the tray 3.1 of the package situated thereabove. A covering 3.3 stabilising the topmost package is placed onto the bottles 3.2 of said package. The packages 3 are, for example, empty packages with empty bottles 3.2, which are being returned to a beverage manufacturer as empties.

In the system 1, in each case a plurality of package stacks 4, i.e. in the possible embodiment represented a total of four package stacks 4, formed on one transport carrier 2 are combined together with the transport carriers 2 to form one package stack arrangement 5, which then has two packages 3 in five horizontal layers 6 in two rows 6.1 and 6.2 extending in the transport and operating direction A.

A layerwise unstacking of the package stack arrangement 5 is effected in an unstacking device or in a depalletizing means 7 of the system 1, by using a transfer device, which is a component of the depalletizing means 7 and by means of which, at the standby position 7.1, the packages, for example, of the respectively topmost layer 6 are removed from the package stack arrangement and are deposited onto a depositing or transport table 7.2 to be passed on to conveyors 8 or 9, the two packages 3 of the row 6.1 to be passed on to the conveyor 8 and the two packages 3 of the row 6.2 to be passed on to the conveyor 9 in such a manner that the packages 3 on the two conveyors 8 and 9 are spaced apart. At a junction 10 the packages 3 are conducted onto a common conveyor 11, by means of which the packages 3 are supplied in a single-track package stream to a further use, for example to an unpacker that removes the bottles 3.2 from the trays 3.1.

After the removal of the last or respectively the bottommost layer 6 from the transport carriers 2, the empty transport carriers are discharged from the system 1, as is indicated in FIG. 1 by the arrow B.

Figure 2:
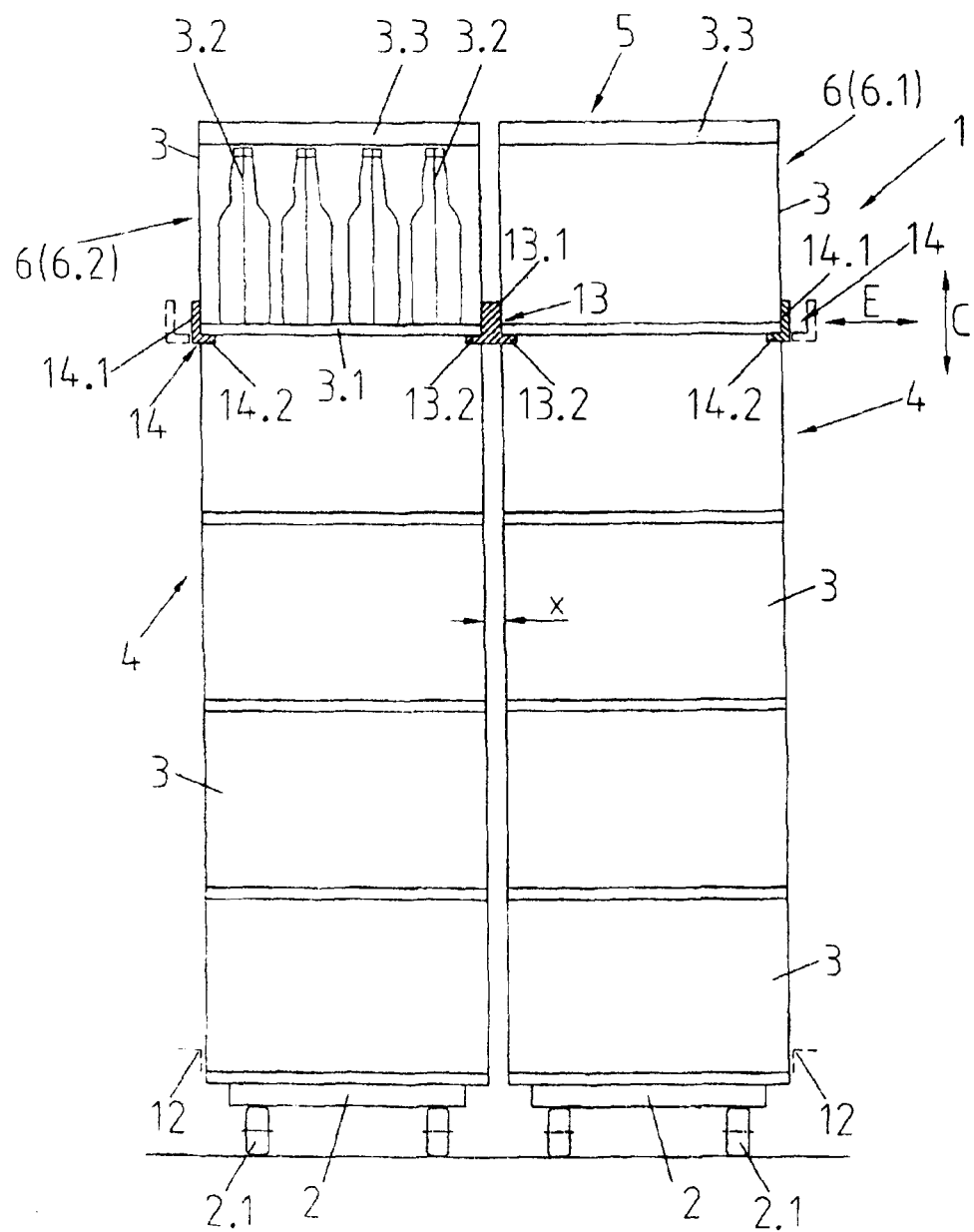
FIG. 2 shows in a highly schematic manner the unstacking device or the depalletizing means of the system in FIG. 1.

FIG. 2 shows a schematic representation and side view of the package stack arrangement 5 comprising the package stacks 4 each positioned on one transport carrier 2. By means of corresponding guides, which are shown in a very schematic manner in FIG. 2 by the reference 12, the individual transport carriers 2 are accurately positioned at the standby position 7.1 during the unstacking procedure, in such a manner that a spacing x is formed between the two rows 6.1 and 6.2 of each layer 6 that extend in the transport or processing direction A and consequently at right angles to the drawing plane in FIG. 2. This makes it possible to introduce a support arm 13 of the transfer device in a horizontal manner between the rows 6.1 and 6.2 of the layer to be removed from the package stack arrangement 5 in such a manner that the support arm 13, orientated with its longitudinal extension in the horizontal direction and also parallel or substantially parallel to the transport or processing direction A, is positioned with a support arm section 13.1 between the trays 3.1 of the two rows of packages 6.1 and 6.2 and, with in each case one support arm section 13.2 that protrudes laterally on the bottom of the section 13.1, forms a bearing surface for the bottom of the trays 3.1 at an exterior region that has not been taken up by the bottles 3.2.

Two outside support frames 14 are also provided in addition to the inside support frame 13, said outside support arms also being orientated with their longitudinal extension in the horizontal direction, parallel or substantially parallel to the transport and processing direction A and consequently, in the representation in FIG. 2, at right angles to the drawing plane of said Figure. These two outside support arms 14 are positioned for the removal of the respective layer 6 in such a manner at the outsides of the two rows 6.1 and 6.2 that, with a support arm section 14.1, they are adjacent an outside of the tray 3.1 in each case and with a support arm section 14.2 that protrudes on the bottom of the section 14.1 at the side of said section, form a bearing surface for the bottom of the tray 3.1. The two support arms 13 and 14 are components of a, for example, fork-like support or transfer frame 15 of the depalletizing means 7 and together with said support or transfer frame 15 are displaceable in a controlled manner in the vertical and horizontal direction, the vertical travel being indicated by the double arrow C in FIG. 2 and the horizontal travel being indicated by the double arrow D FIG. 1. The two outside support arms 14 are additionally displaceable in a controlled manner in the horizontal direction and at right angles to their longitudinal extension (double arrow E), in order, in this manner, by moving the two outside support arms 13 and 14 towards each other, to centre the packages 3 of the layer 6 to be removed on the support arms 13 and 14 and ultimately to secure them, or respectively after setting the respective layer 6 down onto the transport table 7.2 by moving the two outside support arms 14 apart, in order to release the packages 3 from the transfer device or respectively from the support or transfer frame 15.

Figure 3:
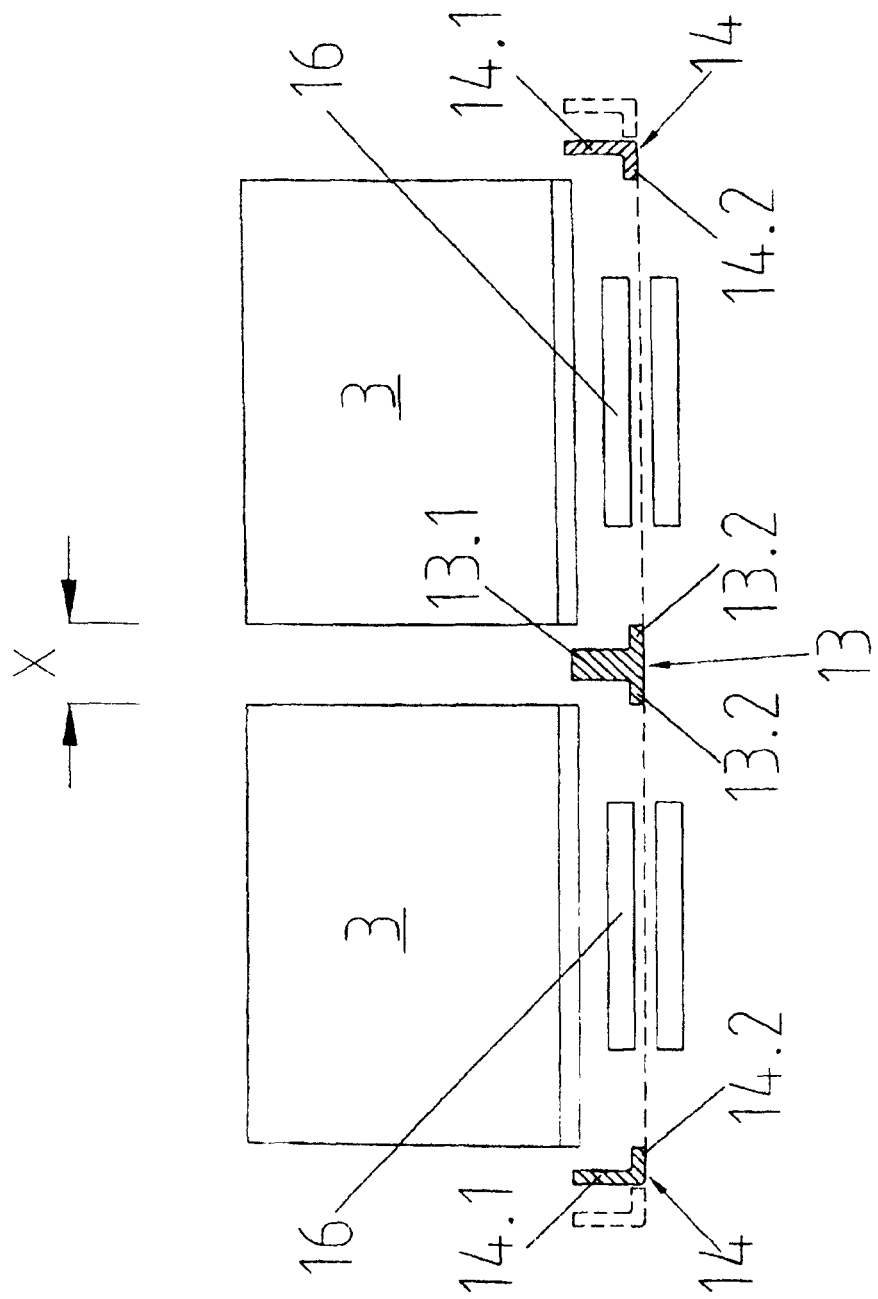
FIG. 3 shows a simplified representation of a section through a transport table of the depalletizing means.

The unstacking of the package stack arrangement 5 is therefore effected in detail in such a manner that the support arm 13 is positioned between the two rows 6.1 and 6.2 and the support arms 14 are positioned at the outside of said rows such that the sections 13.2 and 14.2 are situated at the underside of the tray 3.1, that the two outside support arms 14 are then moved or advanced in the direction of the inside support arm 13, that the support or transfer frame 15 formed by the support arms 13 and 14 is then raised vertically and is then moved horizontally over the transport table 7.2, and that finally, by lowering the support or transfer frame 15, the packages 3 are deposited onto the transport table 7.2 or onto conveyor belts 16 forming said transport table, said conveyor belts protruding beyond the support frame sections 13.2 and 14.2 of the lowered support arms 13 and 14 and forming bearing surfaces for the bottom of the packages 3 (FIG. 3).

The present application has been described above by way of a possible embodiment. It is obvious that numerous modifications and conversions are possible without departing from the concept underlying the present application.

It has been assumed above that the unstacking of the package stack arrangement 5 is effected layerwise in each case. In principle, however, it is possible using the depalletizing means 7 to remove several layers 6 in the form of a part stack from the package stack arrangement 5 or even all or substantially all or most of the layers 6 of the package stack arrangement from the transport carriers 2 and to deposit them onto the transport table 7.2 in one operating cycle. In addition, the transport carriers 2 can also be transport pallets, on which at least one stack 4 is then formed in each case from a plurality of a packages 3.

In addition, it can be possible to provide two such support arms positioned parallel or substantially parallel to each other in place of one single support arm 13, said two support arms in each case having an L-like profile with a vertical support arm section that forms a lateral abutment for the trays 3.1 and a horizontal support arm section 13.2 that forms a support for the trays 3.1 and being displaceable in the horizontal direction at right angles to their longitudinal extension, such that when the respective layer 6 or even a plurality of layers are deposited onto the transport table 7.2, the two rows 6.1 and 6.2 can be further spaced apart.

In at least one possible embodiment of the present application, the section 14.2 of the support arm 14 and the section 13.2 of the support arm 13 may comprise a wedge shape. The wedge shape of the sections 13.2 and 14.2 may be configured to promote the insertion of the support arms 13 and 14 between packages 3 during depalletization of the package stacks 4.

For example, the section 14 may comprise a wedge shape along the length of the section 14. The wedge shape may be configured so that when the section 14.2 is inserted between the packages 3, the tip of the wedge of the section 14.2 is first inserted underneath the package to be depalletized. As the support arm 14 is further advanced under the package 3, more of the wedge of the section 14.2 is moved under the package 3 to be depalletized. In one possible embodiment, when the section 14.1 of the support arm 14 is flush against package 3, the entire wedge of the section 14.2 is underneath the package 3. The wedge shape is configured such that the top portion of the section 14.2 is substantially parallel to the bottom of the package 3 to be depalletized, and the bottom portion of the section 14.2 is disposed transverse to the top portion of the section 14.2. The bottom portion of the section 14.2 may be curved or linear.

Each section 13.2 of the support arm 13 may also comprise a wedge shape. The wedge shape may be configured so that when each section 13.2 is inserted between the packages 3, the tip of the wedge of the section 13.2 is first inserted underneath the packages 3 to be depalletized. As the support arm 13 is further advanced under the packages 3, more of the wedge of the section 13.2 is moved under the packages 3 to be depalletized. In one possible embodiment, when the support arm 13 is fully inserted and engaged with the packages 3 to be depalletized, the entire wedge of the section 13.2 is underneath the package 3. In the wedge shape of the section 13.2, one side edge of the section 13.2 is disposed farther from the other side edge of the section 13.2.

Finally, the system 1 can also be used as a palletizing means or respectively for stacking the packages 3, the depalletizing means 7 then being operated as palletizing means, the packages 3 being supplied to the transport table 7.2 of said palletizing means by means of conveyors 8 and 9 in such a manner that layers 6 each with two rows 6.1 and 6.2 with two packages in each case per row are formed on the transport table 7.2 by the packages 3. Said layers 6 are then engaged by the support or transfer frame 15, formed by the support arms 13 and 14, and are deposited onto at least one support carrier standing by at the position 7.1 or onto a package part stack already formed at that location.

In at least one possible embodiment of the present application, the apparatus of the present application may be used for both stacking and unstacking packages. In other words, the apparatus disclosed in the present application may possibly be utilized for both palletizing and depalletizing packages. In one possible embodiment, the apparatus may be used to stack packages in package stacks 4 or package stack arrangements 5. The support or transfer frame 15, which comprises the support arms 13 and 14, transfer packages 3 from conveyors, such as conveyors 11, 8, and/or 9, and place the packages 3 on rollers or dollies 2.

Figure 4:
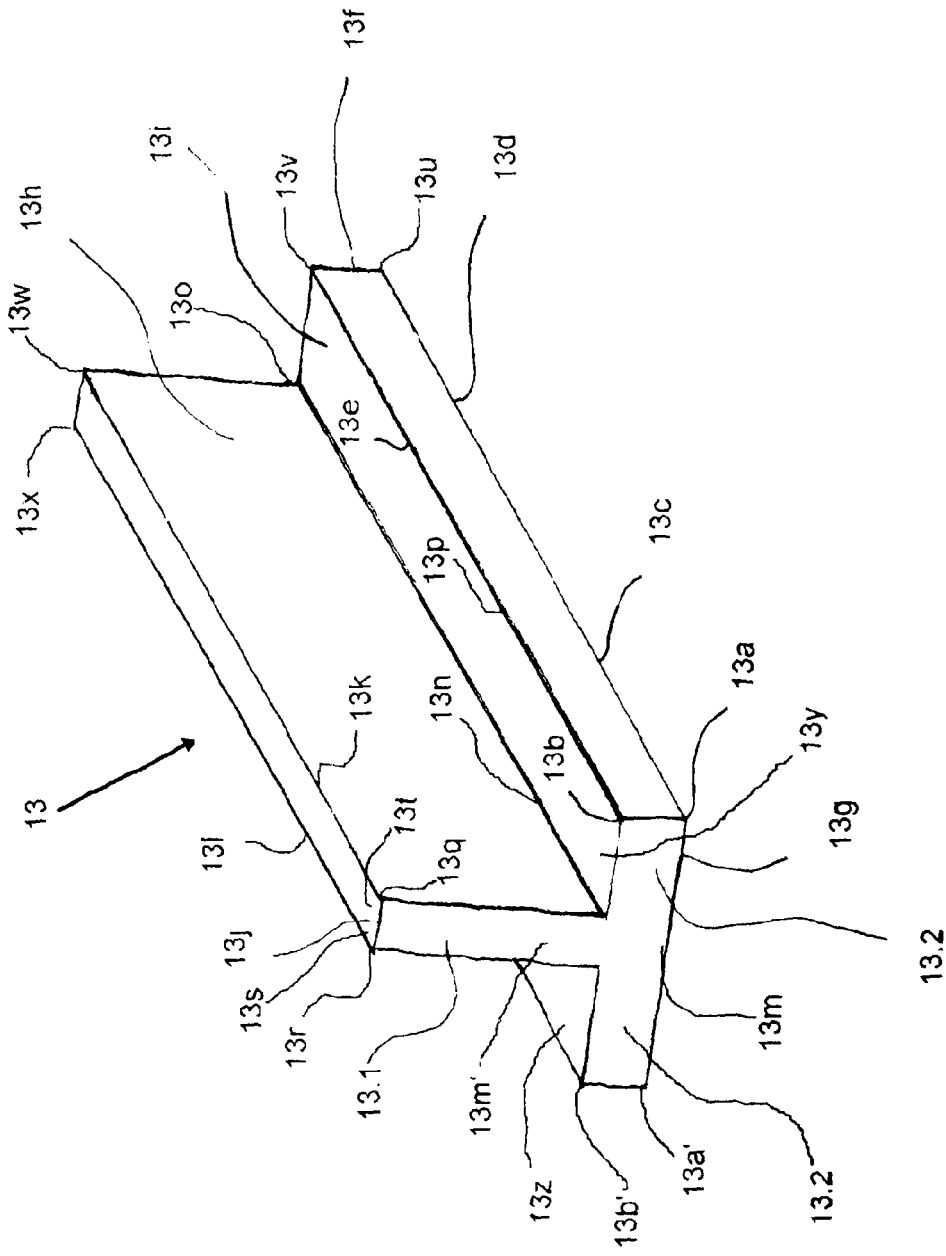
FIG. 4 shows one possible embodiment of a support arm of the present application.

FIG. 4 may show one schematic representation of a support arm 13 of the present application. The support arm 13 comprises a section 13.1. In at least one possible embodiment of the present application, the section 13.1 comprises a width, a length, and a height. The width of the section 13.1 comprises points 13*j*, 13*q*, and 13*r* disposed along the width. The length comprises points 13*k*, 13*l*, 13*q*, 13*r*, 13*w*, and 13*x* disposed along the length. The height comprises points 13*j*, 13*q*, 13*r*, and 13*m* disposed along the height. The section 13.1 also comprises a surface 13*h*, which may comprise a non-stick or friction-reducing coating, such as Teflon.

In at least one possible embodiment of the present application, the surface 13*h* begins at the point 13*j* and extends longitudinally to the point 13*k* along the length of the section 13.1, cutting off the corner 13*q*. The edge of surface 13*h*, which extends from 13*j* to 13*k* may be linear or curved. The surface opposite of surface 13*h*, disposed along the length of the section 13.1, may begin at the point 13*j* and may extend longitudinally to the point 13*l* and 13*n* along the length of the section 13.1, cutting off the corner 13*r*. The edge of the surface opposite surface 13*h*, which extends from 13*j* to 13*l* and 13*n* may be linear or curved. In this possible embodiment, the points 13*j* and 13*m* rest on the tip of a wedge. If the spacing x between the package stack arrangements 5 is wider than the greatest width of the section 13.1 of the support arm 13, then the wedge shape of the section 13.1 may promote a smooth insertion of the support arm 13 between the package stack arrangements 5.

In at least one possible embodiment of the present application, the support arm 13 comprises a section 13.2. The section 13.2 is configured to slide between packages 3 arranged in package stack arrangements 5 and/or package stacks 4. The section 13.2 comprises a height, a width, and a length. The height comprises points 13*a* and 13*b*. The length comprises points 13*a*, 13*b*, 13*c*, 13*p*, 13*d*, 13*e*, 13*o*, and 13*v*. The section 13.2 comprises a surface 13*i* extending longitudinally along the length of the section 13.2. The width comprises points 13*a*, 13*a'*, 13*b*, and 13*b'*, and the width may also comprise the edge 13*g*. The surface 13*i* may comprise a non-stick or friction-reducing coating, such as Teflon.

In at least one possible embodiment of the present application, the surface 13*i* may begin at the edge 13*g* and may extend longitudinally to the point 13*p* along the length of the section 13.2, extending farther to the points 13*o* and 13*v*, cutting off the corners 13*b* and 13*b'* and the edge 13*f*. The edge of surface 13*i*, which extends from 13*g* to 13*p* may be linear or curved. In this possible embodiment, the edge 13*g* may be the tip of a wedge. This wedge shape of the section 13.2 may promote a smooth insertion of the support arm 13 between the packages 3 in the package stacks 4. The uppermost package 3 to be depalletized may slide onto the section 13.2 and be lifted onto the surface 13*i* of the section 13.2 of the support arm 13.

In at least one possible embodiment of the present application, the portions 13*s*, 13*t*, 13*y*, and 13*z* may be removed from the support arm 13, in order to produce wedge-shaped portions. These wedge-shaped portions may promote a smooth insertion of the support arm 13 between the packages 3 in the package stacks 4. The uppermost package 3 to be depalletized may slide onto the section 13.2 and be lifted onto the surface 13*i* of the section 13.2 of the support arm 13. The vertical, or substantially vertical, edge of one wedge portion may comprise an edge 13*m'*, extending from point 13*j* to point 13*m*.

Figure 5:
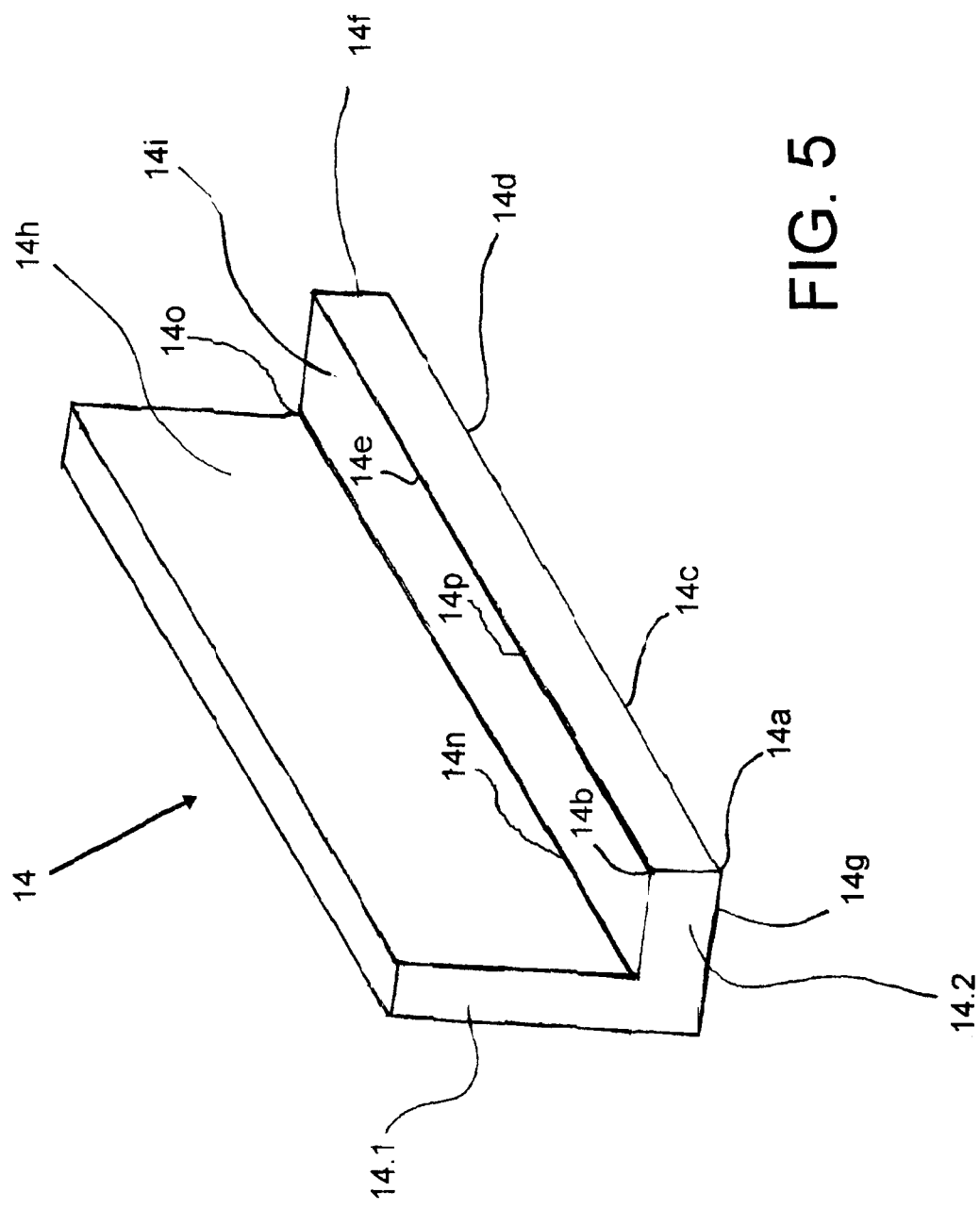
FIG. 5 shows one possible embodiment of a support arm of the present application.

FIG. 5 may show one possible embodiment of a support arm 14. In at least one possible embodiment of the present application, the surface 14*i* may begin at the edge 14*d* and may extend to the edge 14*n*, cutting off the points 14*b*, 14*p*, and 14*e*. The surface 14*i*, which extends from 14*d* to 14*n* may be linear or curved. In this possible embodiment, the edge 14*d* may be the tip of a wedge. This wedge shape of the section 14.2 may promote a smooth insertion of the support arm 14 between the packages 3 in the package stacks 4. The uppermost package 3 to be depalletized may slide onto the section 14.2 and be lifted onto the surface 14*i* of the section 14.2 of the support arm 14.

Figure 6:
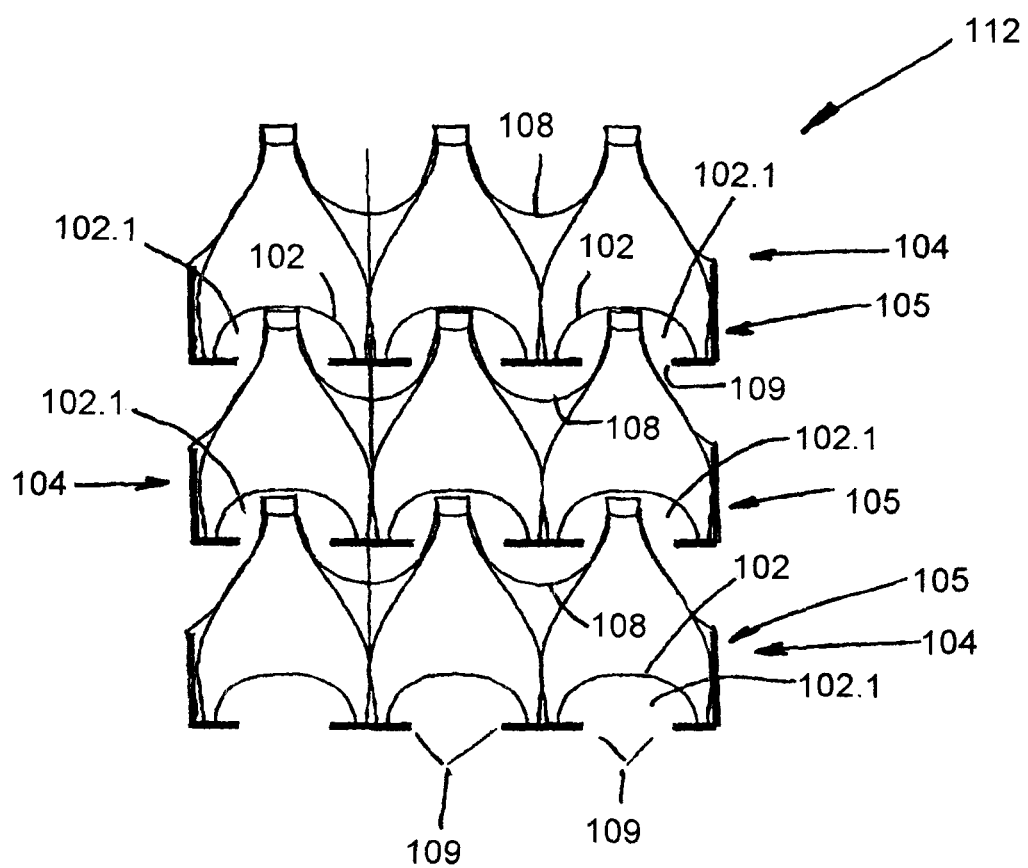
FIG. 6 shows a stack of packaging units formed by a plurality of packaging units stacked one on top of another.

As FIG. 6 may show, in at least one possible embodiment the described realization of the packaging unit 104 has the advantage or relative advantage, among other things, that a plurality of such packaging units 104 can be stacked one on top of another into a packaging unit stack 112, whereby with the exception of the uppermost packaging unit 104, in this stack 112 of packaging units 104, the containers of each packaging unit 4 extend or essentially extend with their upper container segment that has the container mouth 103 through the openings 109 and 110 into the open spaces 102.1 of the packaging unit 104 above, which are formed by the concavely arched container bottoms 102 of the respective containers 101 located above, which results in a packaging unit that is stable for transport and/or storage and/or individual sale, and which is then conventionally located on a palette (not shown).

With the exception of the container 101 of the uppermost packaging unit 104, the containers 101 lie with the container mouths 103 each against or essentially against the container bottom 102 of a container 101 above in the stack 112 of packaging units. Basically, however, it is also possible, by an appropriate adjustment at least of the tray openings 109 to ensure or substantially ensure that the trays 105 (with the exception of the bottommost tray 105) in the stack 112 of packaging units 112 are supported or essentially supported with the edge of the tray openings 109 each on the expanding area of the container 101 or the body area of the containers, so that each of the container mouths is at a distance from the container bottom of the container 101 lying above it in the stack 112 of packaging units and is thus relieved or somewhat relieved of some of the forces exerted on it.

In at least one possible embodiment support arms 13 and 14 of the present application are configured to be moved underneath the tray 105. The sections 13.2 and 14.2 are configured to rest under the sides of a tray 105, in the gap between packages 104, in order to lift the tray 105 and package 104.

Figure 7:
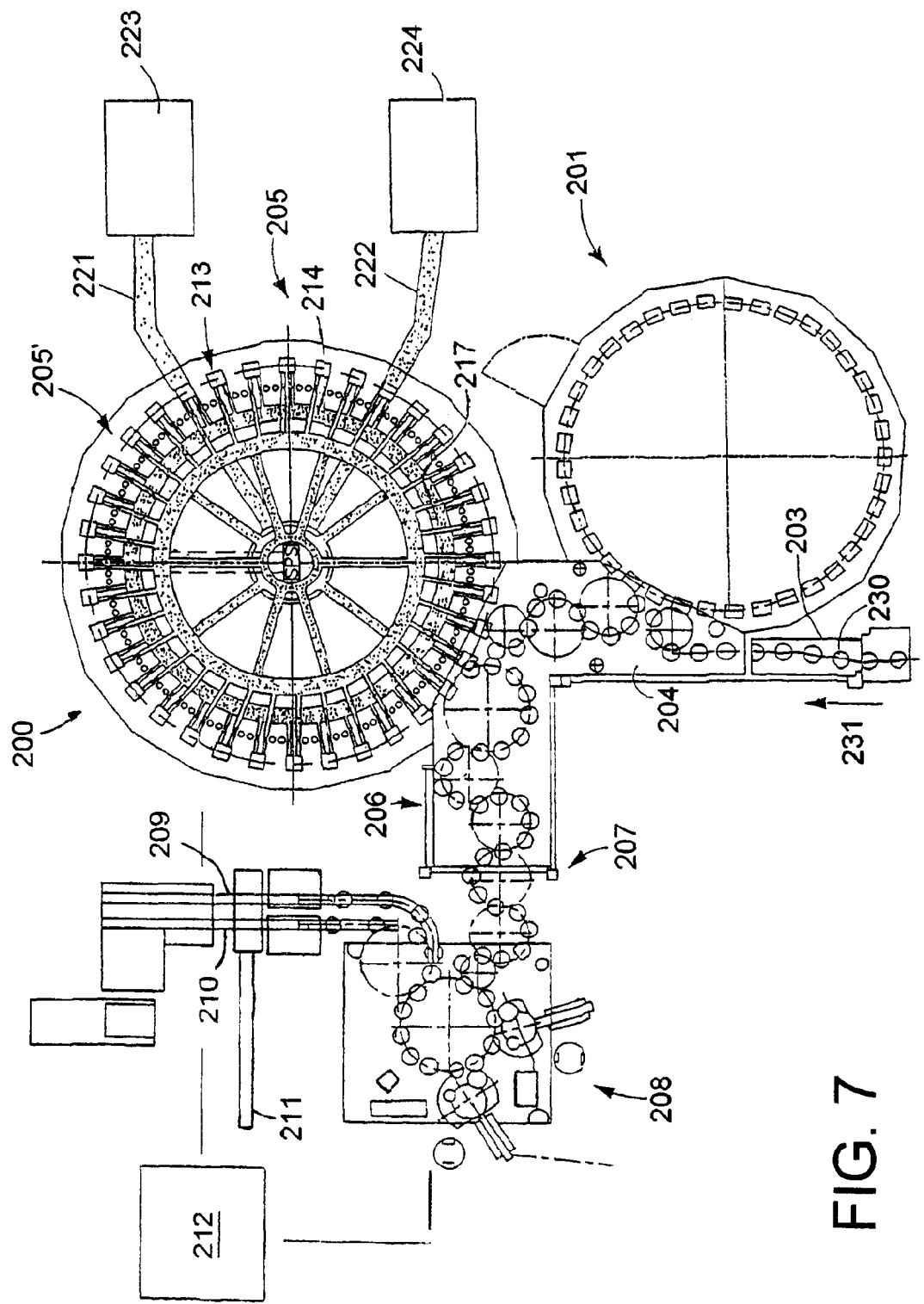
FIG. 7 shows schematically the main components of one possible embodiment example of a system for filling containers, in accordance with at least one possible embodiment, in which system or plant could possibly be utilized at least one aspect, or several aspects, of the embodiments disclosed herein.

FIG. 7 shows schematically the main components of one possible embodiment example of a system for filling containers, specifically, a beverage bottling plant for filling bottles 130 with at least one liquid beverage, in accordance with at least one possible embodiment, in which system or plant could possibly be utilized at least one aspect, or several aspects, of the embodiments disclosed herein.

FIG. 7 shows a rinsing arrangement or rinsing station 201, to which the containers, namely bottles 230, are fed in the direction of travel as indicated by the arrow 231, by a first conveyer arrangement 203, which can be a linear conveyor or a combination of a linear conveyor and a starwheel. Downstream of the rinsing arrangement or rinsing station 201, in the direction of travel as indicated by the arrow 231, the rinsed bottles 230 are transported to a beverage filling machine 205 by a second conveyer arrangement 204 that is formed, for example, by one or more starwheels that introduce bottles 230 into the beverage filling machine 205.

The beverage filling machine 205 shown is of a revolving or rotary design, with a rotor 205', which revolves around a central, vertical machine axis. The rotor 205' is designed to receive and hold the bottles 230 for filling at a plurality of filling positions 213 located about the periphery of the rotor 205'. At each of the filling positions 203 is located a filling arrangement 214 having at least one filling device, element, apparatus, or valve. The filling arrangements 214 are designed to introduce a predetermined volume or amount of liquid beverage into the interior of the bottles 230 to a predetermined or desired level.

The filling arrangements 214 receive the liquid beverage material from a toroidal or annular vessel 217, in which a supply of liquid beverage material is stored under pressure by a gas. The toroidal vessel 217 is a component, for example, of the revolving rotor 205'. The toroidal vessel 217 can be connected by means of a rotary coupling or a coupling that permits rotation. The toroidal vessel 217 is also connected to at least one external reservoir or supply of liquid beverage material by a conduit or supply line. In the embodiment shown in FIG. 7, there are two external supply reservoirs 223 and 224, each of which is configured to store either the same liquid beverage product or different products. These reservoirs 223, 224 are connected to the toroidal or annular vessel 217 by corresponding supply lines, conduits, or arrangements 221 and 222. The external supply reservoirs 223, 224 could be in the form of simple storage tanks, or in the form of liquid beverage product mixers, in at least one possible embodiment.

As well as the more typical filling machines having one toroidal vessel, it is possible that in at least one possible embodiment there could be a second toroidal or annular vessel which contains a second product. In this case, each filling arrangement 214 could be connected by separate connections to each of the two toroidal vessels and have two individually-controllable fluid or control valves, so that in each bottle 230, the first product or the second product can be filled by means of an appropriate control of the filling product or fluid valves.

Downstream of the beverage filling machine 205, in the direction of travel of the bottles 230, there can be a beverage bottle closing arrangement or closing station 206 which closes or caps the bottles 230. The beverage bottle closing arrangement or closing station 206 can be connected by a third conveyer arrangement 207 to a beverage bottle labeling arrangement or labeling station 208. The third conveyer arrangement may be formed, for example, by a plurality of starwheels, or may also include a linear conveyor device.

In the illustrated embodiment, the beverage bottle labeling arrangement or labeling station 208 has at least one labeling unit, device, or module, for applying labels to bottles 230. In the embodiment shown, the labeling arrangement 208 is connected by a starwheel conveyer structure to three output conveyer arrangements: a first output conveyer arrangement 209, a second output conveyer arrangement 210, and a third output conveyer arrangement 211, all of which convey filled, closed, and labeled bottles 230 to different locations.

The first output conveyer arrangement 209, in the embodiment shown, is designed to convey bottles 230 that are filled with a first type of liquid beverage supplied by, for example, the supply reservoir 223. The second output conveyer arrangement 210, in the embodiment shown, is designed to convey bottles 230 that are filled with a second type of liquid beverage supplied by, for example, the supply reservoir 224. The third output conveyer arrangement 211, in the embodiment shown, is designed to convey incorrectly labeled bottles 230. To further explain, the labeling arrangement 208 can comprise at least one beverage bottle inspection or monitoring device that inspects or monitors the location of labels on the bottles 230 to determine if the labels have been correctly placed or aligned on the bottles 230. The third output conveyer arrangement 211 removes any bottles 230 which have been incorrectly labeled as determined by the inspecting device.

The beverage bottling plant can be controlled by a central control arrangement 212, which could be, for example, computerized control system that monitors and controls the operation of the various stations and mechanisms of the beverage bottling plant.

The present application relates to a method for unstacking packages disposed on a transport carrier as a stack, in which at least two package stacks disposed on a transport carrier are combined into a package stack arrangement comprising a plurality of layers of two packages each in the vertical direction.

One feature or aspect of an embodiment is believed at the time of the filing of this patent application to possibly reside broadly in a method for unstacking packages 3, positioned in each case on a transport carrier 2 in the form of a package stack 4, by using a depalletizing means 7 with a support or transfer frame 15 that is displaceable in a controlled manner in the horizontal and/or vertical direction, wherein, at a first position 7.1 of the depalletizing means 7, the packages 3 form a package stack arrangement 5, which includes at least two packages 3 in a plurality of layers 6 that are positioned one above the other in the vertical direction, and from which the packages 3 are removed layerwise or in the form of a part or total stack with the assistance of the support or transfer frame 15 and are deposited at a further position 7.2 of the depalletizing means 7 for removal by means of at least one conveyor 8, 9, wherein at least two package stacks 4 each positioned on one transport carrier 2 are combined to form the package stack arrangement 5, and in that the picking-up of the packages 3 at the first position 7.1 is effected by means of at least one inside and at least two outside support arms 13, 14 of the carrier or transfer frame 15, of which support arms the inside support arm 13 is introduced between the at least two packages 3 of the lowest layer 6 to be removed in such a manner that it forms a lateral support and at the same time also a bearing surface for the packages 3 positioned on the two sides, and of which support arms the outside support arms 14 are positioned at the lowest layer 6 to be removed in such a manner that they each form a lateral support and at the same time also a bearing surface for the packages 3 on their outsides remote from the at least one inside support arm 13.

Another feature or aspect of an embodiment is believed at the time of the filing of this patent application to possibly reside broadly in a method for stacking packages 3 on transport carriers 2 by using a palletizing means 7 with a support or transfer frame 15 that is displaceable in a controlled manner in the horizontal and/or vertical direction, wherein the packages 3 are brought together to form layers 6 or part stacks, each of which having at least two packages 3 per layer 6, and are then picked up layerwise or in the form of a part stack with the assistance of the support or transfer frame 15 and are deposited on transport carriers 2 or part stacks already formed there to form package stacks 5, wherein the picking-up of the packages 3 combined to form layers 6 or part stacks is effected by means of at least one inside and at least two outside support arms 13, 14 of the support or transfer frame 15, of which support arms the inside support arm 13 is introduced between the at least two packages 3 of the respective layer 6 or of the lowest layer 6 of the part stack in such a manner that it forms a lateral support and at the same time also a bearing surface for the packages 3 positioned on the two sides, and of which support arms the outside support arms 14 are positioned at the layer 6 or the lowest layer 6 of the part stack in such a manner that they each form a lateral support and at the same time also a bearing surface for the packages 3 on their outsides remote from the at least one inside support arm 13.

Yet another feature or aspect of an embodiment is believed at the time of the filing of this patent application to possibly reside broadly in the method, wherein the packages 3 are centered and retained, in one possible embodiment free of transverse forces or substantially free of transverse forces, between the support arms 13, 14 on said support arms 13, 14 by advancing the outside support arms 14 in the direction of the inside support arm 13.

Still another feature or aspect of an embodiment is believed at the time of the filing of this patent application to possibly reside broadly in the method, wherein the at least one inside support arm 13, at least in part sections, has a cross section that corresponds to a reverse T or substantially to a reverse T.

A further feature or aspect of an embodiment is believed at the time of the filing of this patent application to possibly reside broadly in the method, wherein the outside support arms 14, at least in part sections, have an angular or L-shaped cross section.

Another feature or aspect of an embodiment is believed at the time of the filing of this patent application to possibly reside broadly in the method, wherein the transport carriers are transport carriers that are provided with rollers.

Yet another feature or aspect of an embodiment is believed at the time of the filing of this patent application to possibly reside broadly in the method, wherein means 12 are provided on the depalletizing means/palletizing means 7 for the accurate positioning of the transport carriers 2 and/or of the package stacks 4 positioned on the transport carriers 2.

Still another feature or aspect of an embodiment is believed at the time of the filing of this patent application to possibly reside broadly in the method, wherein when unstacking, one package stack arrangement 5, in each case comprising at least four package stacks 4 each positioned on one transport carrier 2, is assembled in such a manner that each layer 6 of the package stack arrangement 5 has at least two rows 6.1, 6.2 each with at least two packages 3 per row.

A further feature or aspect of an embodiment is believed at the time of the filing of this patent application to possibly reside broadly in the method, wherein when unstacking, the packages 3 removed from the package stack arrangement 5 are deposited layerwise or in the form of a part or total stack at the additional position 7.2 on a transport table 7.2 formed there and from there are transferred to the at least one conveyor 8, 9.

Another feature or aspect of an embodiment is believed at the time of the filing of this patent application to possibly reside broadly in the method, wherein when stacking, the layers 6 or the part stacks are assembled together such that each layer 6 has at least two rows 6.1, 6.2, each with at least two packages 3 per row, and in that for the stacking, the at least one inside support arm 13 supports the packages 3 between the rows 6.1, 6.2 and the outside support arms 14 support the packages 3 on the outsides of each row 6.1, 6.2 remote from the inside support arm 13.

Yet another feature or aspect of an embodiment is believed at the time of the filing of this patent application to possibly reside broadly in the method, wherein the packages 3 comprise in each case at least one tray 3.1, for example produced of cardboard or paperboard, and a plurality of containers, for example bottles 3.2, positioned on the respective tray 3.1.

Still another feature or aspect of an embodiment is believed at the time of the filing of this patent application to possibly reside broadly in a device for unstacking or stacking packages 3, said device having a support or transfer frame 15 that is displaceable in a controlled manner in the horizontal and/or vertical direction for picking-up layers 6 or total or part stacks, which each have at least two packages 3 per layer 6, at a first position and for depositing the layers 6 or total or part stacks at another position that is separated spatially from the first position, wherein the support or transfer frame 15 has at least one inside and at least two outside support arms 13, 14, of which support arms the inside support arm 13 is introducible between the at least two packages 3 of the respective layer 6 or of the lowest layer 6 of the respective total or part stack in such a manner that it forms a lateral support and at the same time also a bearing surface for the packages 3 on the two sides, and of which support arms the outside support arms 14 are positioned at the one layer 6 or at the lowest layer 6 of the total or part stack in such a manner that they each form a lateral support and at the same time also a bearing surface for the packages 3 at their outsides remote from the at least one inside support arm 13.

A further feature or aspect of an embodiment is believed at the time of the filing of this patent application to possibly reside broadly in the device, wherein the outside support arms 14 can be advanced in the direction of the at least one inside support arm 13.

One feature or aspect of an embodiment is believed at the time of the filing of this patent application to possibly reside broadly in the device, wherein the at least one inside support arm 13, at least in part sections, has a cross section that corresponds to a reverse T or substantially to a reverse T.

Another feature or aspect of an embodiment is believed at the time of the filing of this patent application to possibly reside broadly in the device, the outside support arms 14, at least in part sections, have an angular or L-shaped cross section.

Yet another feature or aspect of an embodiment is believed at the time of the filing of this patent application to possibly reside broadly in the device, wherein at the first position 7.1, means 12 are provided for the accurate positioning of transport carriers 2 and/or of package stacks 4 positioned on the transport carriers 2.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein except for the exceptions indicated herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

U.S. Pat. No. 7,574,843, issued on Aug. 18, 2009, having first-named inventor Christoph KOSTER, and title "METHOD OF MANUFACTURING AND STACKING PACKAGING UNITS WITH INCREASED STABILITY," is hereby incorporated by reference as if set forth in their entirety herein.

Some examples of low friction coatings which may possibly be utilized or adapted for use in at least one possible embodiment may possibly be found in the following U.S. Pat. No. 6,551,718, entitled "Low friction coating;" 6,284,322, entitled "Low-friction coating composition;" U.S. Pat. No. 6,084,034, entitled "Functional coating for reducing friction;" U.S. Pat. No. 5,763,011, "Functional coating for reducing friction;" U.S. Pat. No. 5,674,951, entitled "Abrasion-resistant and low friction coating compositions;" U.S. Pat. No. 5,482,637, entitled "Anti-friction coating composition containing solid lubricants;" and U.S. Pat. No. 4,849,264, entitled "Friction reducing coating for metal surfaces."

Some examples of lifting devices that may possibly be utilized or possibly adapted for use in at least one possible embodiment of the present application may possibly be found in the following patent publications: U.S. Pat. No. 2,535,272 issued to Detrez on Dec. 26, 1950; U.S. Pat. No. 2,642,214 issued to Lippold on Jun. 16, 1953; German Utility Model No. DE-GM 1,923,261 issued on Sep. 9, 1965; German Laid Open Patent Application No. DE-OS 1,532,586 published on Oct. 2, 1969; British Patent No. 1,188,888 issued Apr. 22, 1970; German Laid Open Patent Application No. DE-OS 26 52 910 published on May 24, 1978; German Patent No. DE-PS 26 52 918 issued on Oct. 26, 1978; German Utility Model No. DE-GM 83 04 995 issued on Dec. 22, 1983; German Patent No. DE-PS 26 30 100 issued on Dec. 3, 1981; and German Laid Open Patent Application No. DE-OS 195 45 080 published on Jun. 5, 1997.

Some examples of push bars, depalletizers, palletizers, and methods, which may possibly be utilized or adapted for use in at least one possible embodiment of the present application, may possibly be found in the following U.S. Pat. No. 7,448,449, having the title "Automated bundle and pallet preparation system and method of use," published on Nov. 11, 2008; U.S. Pat. No. 5,489,016, having the title "Pusher bar apparatus to remove containers from a splice plate between conveyors," published on Feb. 6, 1996; U.S. Pat. No. 6,425,226, having the title "System and method for order packing," published on Jul. 30, 2002; and U.S. Pat. No. 5,996,316, having the title "System and method for order packing," published on Dec. 7, 1999.

All of the patents, patent applications or patent publications, which were cited in the German Office Action dated Mar. 11, 2008, and/or cited elsewhere are hereby incorporated by reference as if set forth in their entirety herein, except for the exceptions indicated herein, as follows: DE 10 2005 016 431, having the following English translation of the German title "Device for unstacking top opening, especially filled stacking containers on a palette has movable gripper(s) and holding fork(s) connected to gripper(s) for receiving, removing stacking container(s) from topmost stacking position," published on Oct. 19, 2006; DE 91 11788, having the German title "Vorrichtung zum Entstapeln von blockweise auf Paletten gestapelten Zuschnitten," published on Nov. 14, 1991; DE 88 04 175, having the German title "Ladeblechteil einer Maschine zum Palettieren von Stückgütern," published on May 26, 1988; DE 4128 809, having the following English translation of the German title "Pallet unloading device with side grippers—uses displaceable plate to support and remove top packs as they tilt sideways," published on Mar. 4, 1993; U.S. Pat. No. 5,462,400, having the title "Method and apparatus for mechanical loading and unloading," published on Oct. 31, 1995; and DE 40 33 587, having the following English translation of the German title "Handling device for articles such as cardboard boxes," published on Apr. 23, 1992.

All of the patents, patent applications or patent publications, which were cited in the International Search Report dated Nov. 14, 2008, and/or cited elsewhere are hereby incorporated by reference as if set forth in their entirety herein, except for the exceptions indicated herein, as follows: EP 0 366 943, having the following English translation of the German title "Device for stacking crates onto each other," published on May 9, 1990; NL 8 900 654, having the following English translation of the Dutch title "Vertical crates stacker—has clamping jaw-type grippers, and guides with switch points," published on Oct. 16, 1990; DE 84 25 924, having the following German title "Schienen-Transportsystem mit im Abstand von der Lagerebene angeordnetem Verfahrwagen," published on Apr. 1, 1993; EP 0 482 406, having the following English translation of the German title "Handling device for articles such as cardboard boxes," published on Apr. 29, 1992; DE 29 01 105, having the German title "VORRICHTUNG ZUM SCHICHTWEISEN BE—ODER ENTLADEN VON PALETTEN MIT FLASCHENKAESTEN," published on Jul. 24, 1980; and DE 41 24 703, having the following English translation of the German title "Palletising machine for stacking crates—uses concave or stepped loading support face to overcome irregular surfaces," published on Jan. 28, 1993.

The patents, patent applications, and patent publications listed above in the preceding paragraph(s) are herein incorporated by reference as if set forth in their entirety except for the exceptions indicated herein. The purpose of incorporating U.S. patents, Foreign patents, publications, etc. is solely to provide additional information relating to technical features of one or more embodiments, which information may not be completely disclosed in the wording in the pages of this application. However, words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned words in this sentence, when not used to describe technical features of one or more embodiments of the patents, patent applications, and patent publications, are not considered to be incorporated by reference herein.

The corresponding foreign and international patent publication applications, namely, Federal Republic of Germany Patent Application No. 10 2007 036 900.1, filed on Aug. 6, 2007, having inventor Joachim JUNGHANS, and DE-OS 10 2007 036 900.1 and DE-PS 10 2007 036 900.1, and International Application No. PCT/EP2008/005758, filed on Jul. 15, 2008, having WIPO Publication No. WO 2009/018895 and inventor Joachim JUNGHANS, are hereby incorporated by reference as if set forth in their entirety herein, except for the exceptions indicated herein, for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein except for the exceptions indicated herein.

The purpose of incorporating the corresponding foreign equivalent patent application(s), that is, PCT/EP2008/005758 and German Patent Application 10 2007 036 900.1, is solely for the purpose of providing a basis of correction of any wording in the pages of the present application, which may have been mistranslated or misinterpreted by the translator. However, words relating to opinions and judgments of the author and not directly relating to the technical details of the description of the embodiments therein are not to be incorporated by reference. The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned word in this sentence, when not used to describe technical features of one or more embodiments of the patents, patent applications, and patent publications, are not generally considered to be incorporated by reference herein.

Statements made in the original foreign patent applications PCT/EP2008/005758 and DE 10 2007 036 900.1 from which this patent application claims priority which do not have to do with the correction of the translation in this patent application are not to be included in this patent application in the incorporation by reference.

Any statements about admissions of prior art in the original foreign patent applications PCT/EP2008/005758 and DE 10 2007 036 900.1 are not to be included in this patent application in the incorporation by reference, since the laws relating to prior art in non-U.S. Patent Offices and courts may be substantially different from the Patent Laws of the United States.

All of the references and documents, cited in any of the documents cited herein, are hereby incorporated by reference as if set forth in their entirety herein except for the exceptions indicated herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

AT LEAST PARTIAL NOMENCLATURE

1 System
2 Transport carrier roller
3 Package
3.1 Tray
3.2 Bottle
4 Package stack on one transport carrier 2 in each case
5 Package stack arrangement
6 Layer
6.1, 6.2 Row
7 Depalletizing/palletizing means
7.1 Standby position
7.2 Transport table
8, 9 Conveyor
10 Junction
11 Conveyor
12 Guide
13 Support arm
13.1, 13.2 Section of support arm 13
14 Support arm
14.1, 14.2 Section of support arm 14
15 Support or transfer frame of depalletizing/palletizing means 7
16 Conveyor belt
A Transport and processing direction
B Transport direction of empty transport carrier 2
C Vertical travel movement of support or transfer frame
D Horizontal travel movement of support or transfer frame 15
E Advancing movement of support arms 14
X Spacing

What is claimed is:

1. A package handling method comprising:
    inserting at least one inner support arm of a package handling device between two vertical stacks of packages, such that said inner support arm supports side and bottom surfaces of an inner portion of each of two packages, one on each of said two stacks;
    inserting each of at least two outer support arms of said package handling device adjacent a corresponding one of said two stacks, such that said outer support arms support side and bottom surfaces of an outer portion of each of said two packages; and
    lifting said two packages simultaneously, using said support arms, either off of said two stacks or off of corresponding stack transport platforms, and then depositing said two packages simultaneously onto a section of a package handling machine.

2. The package handling method according to claim 1, wherein said step of lifting said two packages comprises one of: lifting solely said two packages, and lifting said two packages and at least one package stacked on each of said two packages.

3. The package handling method according to claim 2, wherein said step of inserting each of said at least two outer support arms comprises centering and retaining said two packages, substantially free of transverse forces, by advancing said at least two outer support arms in the direction of said inner support arm.

4. The package handling method according to claim 3, wherein said at least one inner support arm comprises at least a portion with a cross section that corresponds to an inverted T or substantially to an inverted T.

5. The package handling method according to claim 4, wherein each of said outer support arms comprises at least a portion with an angular or L-shaped cross section.

6. The package handling method according to claim 5, wherein:
    said stack transport platforms comprise wheels or rollers; and
    said package handling machine comprises positioning means configured to accurately position said stack transport platforms and/or said stacks of packages on said stack transport platforms.

7. The package handling method according to claim 6, wherein:
    each of said two vertical stacks of packages comprises at least two vertical stacks disposed next to one another on one of said stack transport platforms, and said step of lifting said two packages comprises lifting, using said support arms, a package layer comprising at least four packages; and
    said step of depositing comprises depositing said packages onto a transport table, and said method further comprising transferring said packages from said transport table to at least one conveyor.

8. The package handling method according to claim 7, wherein each of said packages comprises:
    at least one tray comprising cardboard or paperboard; and
    a plurality of containers, such as beverage bottles, positioned on said at least one tray.

9. A package handling method comprising:
    inserting at least one inner support arm of a package handling device between two packages, each package containing at least one item therein, such that said inner support arm supports side and bottom surfaces of an inner portion of each of said two packages;

inserting each of at least two outer support arms of said package handling device adjacent a corresponding one of said two packages, such that said outer support arms support side and bottom surfaces of an outer portion of each of said two packages; and lifting said two packages simultaneously, using said support arms, off of a package support, and then depositing said two packages simultaneously, one each on either two stacks of packages or on corresponding stack transport platforms.

10. The package handling method according to claim 9, wherein said step of lifting said two packages comprises one of: lifting solely said two packages, and lifting said two packages and at least one package stacked on each of said two packages.

11. The package handling method according to claim 10, wherein said step of inserting each of said at least two outer support arms comprises centering and retaining said two packages, substantially free of transverse forces, by advancing said at least two outer support arms in the direction of said inner support arm.

12. The package handling method according to claim 11, wherein said at least one inner support arm comprises at least a portion with a cross section that corresponds to an inverted T or substantially to an inverted T.

13. The package handling method according to claim 12, wherein each of said outer support arms comprises at least a portion with an angular or L-shaped cross section.

14. The package handling method according to claim 13, wherein said step of lifting said two packages comprises lifting, using said support arms, a package layer comprising at least four packages.

15. The package handling method according to claim 14, wherein each of said packages comprises:

at least one tray comprising cardboard or paperboard; and
a plurality of containers, such as beverage bottles, positioned on said at least one tray.

16. A package handling device comprising:

at least one inner support arm configured to be inserted between two vertical stacks of packages, each package being configured to contain at least one item therein, and to support side and bottom surfaces of an inner portion of each of two packages;

at least two outer support arms configured to be inserted adjacent a corresponding one of the two vertical stacks of packages, and to support side and bottom surfaces of an outer portion of each of two packages; and said support arms being configured to simultaneously lift two packages, one from each of the two vertical stacks of packages, and then deposit the two packages simultaneously onto one of: another section of a package handling machine, two stacks of packages, and corresponding stack transport platforms.

17. The package handling device according to claim 16, wherein said at least two outer support arms are configured to be advanced in the direction of said inner support arm to center and retain packages.

18. The package handling device according to claim 17, wherein said at least one inner support arm comprises at least a portion with a cross section that corresponds to an inverted T or substantially to an inverted T.

19. The package handling device according to claim 18, wherein each of said outer support arms comprises at least a portion with an angular or L-shaped cross section.

20. The package handling device according to claim 19, wherein said package handling device comprises positioning means configured to accurately position stack transport platforms and/or stacks of packages on stack transport platforms.

* * * * *